United States Patent
Ikeda (10) Patent No.: US 9,359,934 B2
(45) Date of Patent: Jun. 7, 2016

(54) INTERNAL COMBUSTION ENGINE CONTROL DEVICE

(75) Inventor: Yuji Ikeda, Kobe (JP)

(73) Assignee: IMAGINEERING, INC., Hyogo (JP)

( * ) Notice: Subject to any disclaimer, the term of this patent is extended or adjusted under 35 U.S.C. 154(b) by 941 days.

(21) Appl. No.: 13/512,729

(22) PCT Filed: Oct. 22, 2010

(86) PCT No.: PCT/JP2010/068714
§ 371 (c)(1),
(2), (4) Date: May 30, 2012

(87) PCT Pub. No.: WO2011/065162
PCT Pub. Date: Jun. 3, 2011

(65) Prior Publication Data
US 2012/0239274 A1   Sep. 20, 2012

(30) Foreign Application Priority Data

Nov. 30, 2009 (JP) ................................ 2009-272990

(51) Int. Cl.
*F02P 23/00* (2006.01)
*F02B 1/12* (2006.01)
(Continued)

(52) U.S. Cl.
CPC . *F02B 1/12* (2013.01); *F02B 11/00* (2013.01); *F02D 41/3023* (2013.01);
(Continued)

(58) Field of Classification Search
CPC ......... F02P 9/007; F02P 23/045; F02P 23/00; H01T 13/50

USPC .......... 123/294, 295, 297, 304, 27 R, 27 GE, 123/143 R, 143 B, 607, 605, 608, 618, 635, 123/169 EL; 701/101, 102
See application file for complete search history.

(56) References Cited

U.S. PATENT DOCUMENTS 8,347,850 B2 * 1/2013 Schenk et al. ................ 123/295
8,499,746 B2 * 8/2013 Ikeda ...................... F02B 23/08
123/143 B (Continued)

FOREIGN PATENT DOCUMENTS

| JP | 2001-3800 A | 1/2001 |
| JP | 2006-97603 A | 4/2006 |
| WO | 2009/008522 A1 | 1/2009 |

OTHER PUBLICATIONS

International Search Report of PCT/JP2010/068714, mailing date of Feb. 15, 2011.

*Primary Examiner* — Hai Huynh
*Assistant Examiner* — Raza Najmuddin
(74) *Attorney, Agent, or Firm* — Westerman, Hattori, Daniels & Adrian, LLP (57) ABSTRACT

An internal combustion engine control device which switches between a first operation of compression-igniting a premixed gas in a combustion chamber and a second operation of forcibly igniting the premixed gas through a spark plug in the combustion chamber. When switching between the first operation and the second operation, the control device inserts a transitional operation between the first operation and the second operation for the purpose of reducing torque variations in an internal combustion engine. In the transitional operation, the spark plug does not perform electric discharging, instead, the spark plug emits an electromagnetic wave to increase the temperature of the premixed gas, and subsequently, the premixed gas is compression-ignited.

1 Claim, 4 Drawing Sheets

(51) Int. Cl.
*F02B 11/00* (2006.01)
*F02D 41/30* (2006.01)
*F02P 3/01* (2006.01)
*F02P 5/15* (2006.01)
*F02P 23/04* (2006.01)

(52) U.S. Cl.
CPC .............. *F02D 41/3041* (2013.01); *F02P 3/01* (2013.01); *F02P 5/1504* (2013.01); *F02P 23/045* (2013.01); *Y02T 10/46* (2013.01)

(56) References Cited

U.S. PATENT DOCUMENTS

| | | | |
|---|---|---|---|
| 8,925,532 B2* | 1/2015 | Makarov et al. | 123/623 |
| 2002/0053336 A1 | 5/2002 | Nogi et al. | |
| 2007/0266979 A1* | 11/2007 | Nagamine et al. | 123/143 B |
| 2010/0192909 A1* | 8/2010 | Ikeda | F02D 41/402 123/436 |

* cited by examiner

INTERNAL COMBUSTION ENGINE CONTROL DEVICE

CROSS-REFERENCE TO RELATED APPLICATIONS

This application claims the benefit of International Application No. PCT/JP2010/068714, filed Oct. 22, 2010, which claims priority from Japanese Application No. JP-2009-272990, filed Nov. 30, 2009.

BACKGROUND OF THE INVENTION

1. Field of the Invention

The present invention relates to an internal combustion engine control device, for switching between a first operation of compression-igniting a premixed gas in a combustion chamber and a second operation of forcibly igniting the premixed gas through a discharge unit in the combustion chamber.

2. Related Art

In related art, an internal combustion engine control device switches between a first operation of compression-igniting a premix gas in a combustion chamber and a second operation of forcibly igniting the premixed gas through a discharge unit in the combustion chamber. The internal combustion engine control device is disclosed in, for example, Patent Document 1.

Specifically, the internal combustion engine control device disclosed in Patent Document 1 switches between a self-ignition operation manner equivalent to the first operation and a spark ignition operation manner equivalent to the second operation. When the internal combustion engine control device switches to the spark ignition operation manner, a current actual fuel consumption rate and a reference fuel consumption rate under the assumption of switching to the self-ignition operation manner from the current operation state are calculated. Then, the internal combustion engine control device switches from the spark ignition operation manner to the self-ignition operation manner in the situation that the actual fuel consumption rate is greater than the reference fuel consumption rate.

RELATED ART DOCUMENTS

Patent Documents

Patent Document 1: Japanese Laid-open Patent Publication No. 2006-97603

SUMMARY OF THE INVENTION

The ignition manner and the combustion manner in a first operation of compression-igniting a premix gas in a combustion chamber are respectively different from those in a second operation of forcibly igniting the premixed gas through a discharge unit in the combustion chamber. Therefore, if the operation manner is switched without any other operation manner being inserted between the premix compression-ignition operation and the forcibly ignition operation as in a conventional internal combustion engine control device, the problem of dramatic change in output torque of the internal combustion engine is incurred.

The present invention is achieved, so as to reduce torque variations in the internal combustion engine during switching of an operation manner in an internal combustion engine control device switching between a first operation of compression-igniting a premixed gas in a combustion chamber and a second operation of forcibly igniting the premixed gas through a discharge unit in the combustion chamber.

In a first embodiment, switching between the first operation and the second operation is performed according to an operation state of the internal combustion engine (20). During the switching between the first operation and the second operation, a transitional operation is inserted between the first operation and the second operation. For example, during the switching from the first operation to the second operation, the operation manner of the internal combustion engine (20) changes from the first operation to the transitional operation, and then to the second operation.

Here, the first operation is an operation in which the premixed gas is compression-ignited in the combustion chamber (10). In the first operation, multiple positions of the premixed gas are ignited substantially at the same time. Strictly speaking, very small time differences lie between ignition timings of the positions. In the first operation, during a compression stroke of the premixed gas, the overall temperature of the premixed gas rises. Therefore, at the moment of initial ignition, the premixed gas not ignited enters a state very close to the coming ignition. After the initial ignition, ignition occurs one after another within a very short period of time, and flames diffuse from the ignition positions. Like this, in the first operation, the multiple positions of the premixed gas are ignited substantially at the same time, so that burning time of the first operation is very short, and an internal pressure peak value of the combustion chamber (10) is large. On the other hand, the second operation is an operation in which the discharge unit (11) performs electric discharging in the combustion chamber (10) to forcibly ignite the premixed gas. In the second operation, flames diffuse from positions forcibly ignited by the discharge unit (11), and the flames are spread. Compared with the first operation, the second operation has less ignited positions. Therefore, compared with the first operation, in the second operation the burning time is longer, and the internal pressure peak value in the combustion chamber (10) is smaller.

Furthermore, the transitional operation is an operation in which an electromagnetic wave radiation unit (12) emits an electromagnetic wave to increase the temperature of the premixed gas, and consequently, the premixed gas is compression-ignited. In the transitional operation, the discharge unit (11) is not used to perform electric discharging. If the electromagnetic wave radiation unit (12) emits the electromagnetic wave, the temperature of the premixed gas in a strong electric field region in the combustion chamber (10) rises dramatically. In the transitional operation, an initial ignition is performed in the region in the premixed gas where the temperature is raised dramatically through the electromagnetic wave. At the moment of the initial ignition, the regions, where the temperature is not raised much through the electromagnetic wave, fail to enter the state very close to the coming ignition. Therefore, the transitional operation has a longer time from the initial ignition to the last ignition than the first operation. Therefore, compared with the first operation, the burning time in the transitional operation is longer, and the internal pressure peak value in the combustion chamber (10) is smaller. Furthermore, the transitional operation has more ignition positions than the second operation so that, compared with the second operation, the burning time is shorter, and the internal pressure peak value in the combustion chamber (10) is larger. In the first invention, during the switching between the first operation and the second operation, the transitional operation is performed between the first operation and the second operation, in which "the burning time and the internal pressure peak value of the combustion chamber (10)" are between those of the first operation and those of the second operation.

In a second embodiment, during the whole period in which the internal combustion engine (20) switches to the second operation, an electromagnetic wave is emitted to plasma formed through the electric discharging performed by the discharge unit (11). Therefore, the premixed gas in the region where the plasma is formed (called "the region formed with the plasma" below) produces a large amount of OH free radicals and ozone within a short period of time. As a result, the OH free radicals and ozone facilitate a combustion reaction of the premixed gas. Furthermore, the temperature and pressure of the premixed gas in the region formed with the plasma rise. In the second embodiment, due to the key factors, the spreading speed of the frames increases. Therefore, compared with a case in which the electromagnetic wave is not emitted to the plasma formed through the electric discharging performed by the discharge unit (11), the burning time in the second operation is shorter, and the internal pressure peak value in the combustion chamber (10) is larger.

In a third embodiment, the switching between a first operation and a second operation is performed according to an operation state of the internal combustion engine (20). During the switching between the first operation and the second operation, a transitional operation is inserted between the first operation and the second operation. Here, the first operation is, as in the first invention, an operation in which the premixed gas is compression-ignited in the combustion chamber (10). As stated above, the burning time of the first operation is very short, and the internal pressure peak value of the combustion chamber (10) is very large. On the other hand, the second operation is an operation in which the discharge unit (11) forcibly ignites the premixed gas in the combustion chamber (10). In the second operation, the electromagnetic wave radiation unit (12) does not emit any electromagnetic wave. In the second operation, flames diffuse from positions forcibly ignited by the discharge unit (11). As stated above, compared with the first operation, the burning time in the second operation is longer, and the internal pressure peak value in the combustion chamber (10) is smaller.

Furthermore, the transitional operation is an operation in which the discharge unit (11) performs the electric discharging in the combustion chamber (10), and the electromagnetic wave radiation unit (12) emits the electromagnetic wave to the plasma formed through the electric discharging. Different from the second operation, the transitional operation uses both the discharge unit (11) and the electromagnetic wave radiation unit (12). As stated above, in the transitional operation, OH free radicals and ozone produced in the region formed with the plasma facilitate the combustion reaction of the premixed gas.

Furthermore, the temperature and pressure of the premixed gas in the region formed with the plasma rise, thereby increasing the spreading speed of the flames. Therefore, compared with the second operation in which the electromagnetic wave is not emitted to the plasma formed through the electric discharging performed by the discharge unit (11), the burning time in the transitional operation is shorter, and the internal pressure peak value in the combustion chamber (10) is larger. Furthermore, compared with the first operation in which the multiple positions of the premixed gas are ignited substantially at the same time, the burning time in the transitional operation is longer, and the internal pressure peak value of the combustion chamber (10) is smaller. In the third embodiment, during the switching between the first operation and the second operation, the transitional operation is performed between the first operation and the second operation, in which "the burning time" and "the internal pressure peak value of the combustion chamber (10)" are between those of the first operation and those of the second operation.

In a fourth embodiment, the transitional region is sandwiched between the first region and the second region. Therefore, during the switching between the first operation and the second operation, the coordinate values on the operation control region showing the operation state of the internal combustion engine (20) pass the transitional region. Therefore, the transitional operation is sandwiched between the first operation and the second operation.

In a fifth embodiment, during the switching between the first operation and the second operation, the transitional operation is performed for only a specific number of cycles. Therefore, the transitional operation is sandwiched between the first operation and the second operation.

Effect of the Invention

In the present invention, during the switching between the first operation and the second operation, the transitional operation is performed between the first operation and the second operation, in which "the burning time" and "the internal pressure peak value of the combustion chamber (10)" are between those of the first operation and those of the second operation. Therefore, the differences in "the burning time" and "the internal pressure peak value of the combustion chamber (10)" between the first operation and the second operation are alleviated through the transitional operation. Therefore, the torque variations in the internal combustion engine (20) are reduced during the switching of the operation manner.

Furthermore, in the second embodiment, during the whole period in which the internal combustion engine (20) switches to the second operation, the electromagnetic wave is emitted to the plasma formed through the electric discharging performed by the discharge unit (11), thereby shortening the burning time of the second operation, and increasing the internal pressure peak value of the combustion chamber (10) of the second operation. Therefore, the differences in "the burning time" and "the internal pressure peak value of the combustion chamber (10)" between the first operation and the second operation are reduced, thereby further reducing the torque variations in the internal combustion engine (20) during the switching of the operation manner.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Embodiments of the present invention are illustrated below in detail with reference to the accompanying drawings. Furthermore, the following embodiments are in essence preferred examples, and are not intended to limit the present invention, application objects, or usage thereof.

Embodiment 1

The Embodiment 1 is an internal combustion engine control device (30) (called "control device" below) of the present invention. An internal combustion engine (20) and the control device (30) are described below.

Structure of Internal Combustion Engine

The internal combustion engine (20) of the Embodiment 1 is a reciprocal type uniform premix compression-ignition engine. That is, the internal combustion engine (20) of the Embodiment 1 is a Homogeneous Charge Compression-ignition (HCCI) engine.

Figure 1:
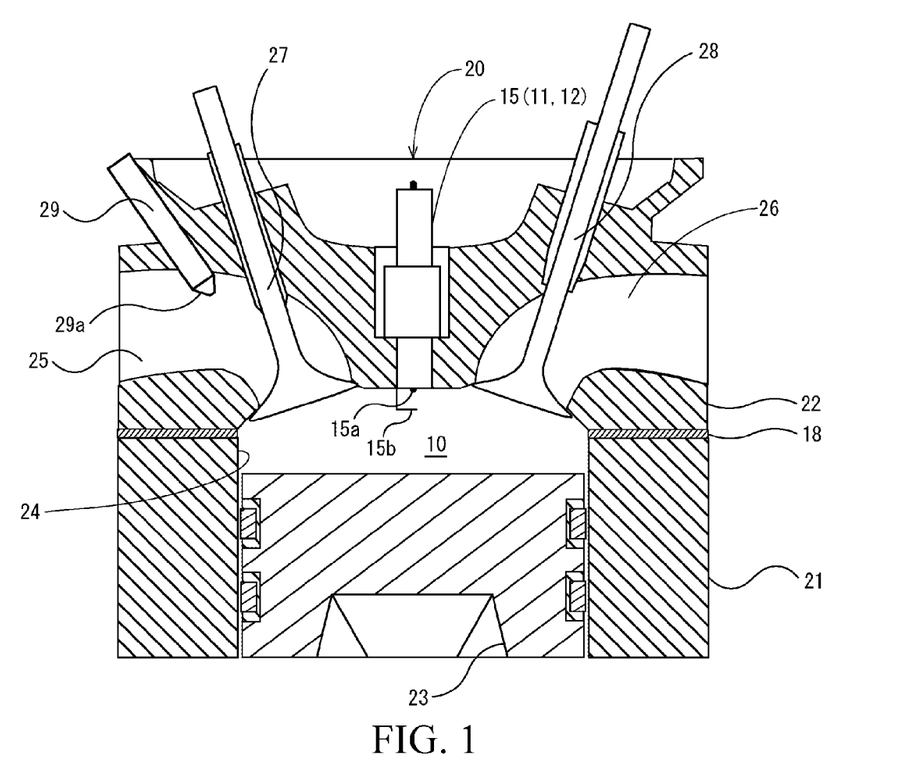
FIG. 1 is a sectional view of an internal combustion engine according to Embodiment 1.

As shown in FIG. 1, the internal combustion engine (20) has a cylinder block (21), a cylinder head (22) and a piston (23). Multiple cylinders (24), each having a cross-section being round, are formed in the cylinder block (21). Furthermore, the number of the cylinder (24) may also be one.

In each of the cylinders (24), the piston (23) is slidably disposed. The piston (23) is connected to a crank shaft (not shown) through a connecting rod. The crank shaft is rotatably supported by the cylinder block (21). In each of the cylinders (24), if the piston (23) performs reciprocating motion in the axial direction of the cylinder (24), the connecting rod converts the reciprocating motion of the piston (23) into rotary motion of the crank shaft.

The cylinder head (22) is mounted on the cylinder block (21) with a gasket (18) therebetween. The cylinder head (22), the cylinders (24) and the piston (23) collectively form a combustion chamber (10). On the cylinder head (22), one or more intake ports (25) and exhaust ports (26) are formed for each of the cylinders (24). An intake valve (27) for opening or closing the intake port (25) and an injector (29) (a fuel injection device) for injecting fuel are disposed at the intake port (25) of each of the cylinders (24). On the other hand, an exhaust valve (28) for opening and closing the exhaust port (26) is disposed at the exhaust port (26) of each of the cylinders (24).

In the Embodiment 1, a nozzle (29a) of the injector (29) is at an opening of the intake port (25), and the fuel injected by the injector (29) is supplied to air circulating in the intake port (25). A premixed gas formed by premixing the fuel and the air is input into the combustion chamber (10).

Figure 2:
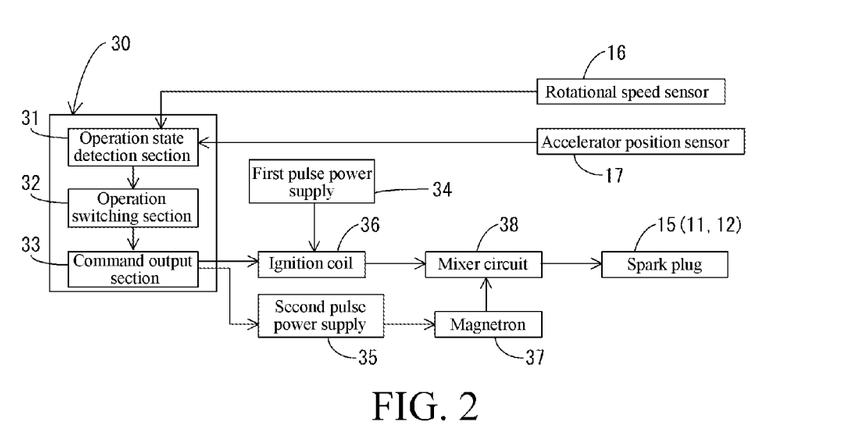
FIG. 2 is a block diagram of an internal combustion engine control device according to Embodiment 1.

On the cylinder head (22), a spark plug (15) is disposed for each of the cylinders (24). The spark plug (15) is fixed on the cylinder head (22). As shown in FIG. 2, the spark plug (15) is connected to an ignition coil (36) and a magnetron (37) through a mixer circuit (38) used for mixing a high-voltage pulse and a microwave. The high-voltage pulse output from the ignition coil (36) and the microwave output from the magnetron (37) are provided to the spark plug (15). Furthermore, the ignition coil (36) is connected to a first pulse power supply (34). The magnetron (37) is connected to a second pulse power supply (35). Furthermore, the magnetron (37) is a microwave oven product (the oscillation frequency is 2.45 GHz).

In the Embodiment 1, the spark plug (15) acts as both a discharge unit (11) for performing electric discharging in the combustion chamber (10) and an electromagnetic wave radiation unit (12) for radiating a microwave to the combustion chamber (10). A discharge electrode (15a) of the spark plug (15) becomes a microwave antenna to emit the microwave.

Structure of Control Device

The control device (30) includes an Electronic Control Unit (ECU). As shown in FIG. 2, the control device (30) has an operation state detection part (31), an operation switching part (32), and a command output part (33). The control device (30) controls the internal combustion engine (20) by outputting signals (an ignition signal and a radiation signal below) to the ignition coil (36) and the second pulse power supply (35).

The operation state detection part (31), the operation switching part (32), and the command output part (33) form operation control units (31, 32, 33). The operation control units (31, 32, 33) switch between a first operation and a second operation according to an operation state of the internal combustion engine (20). The first operation refers to that the premixed gas is compression-ignited in the combustion chamber (10). The second operation refers to that the premixed gas is forcibly ignited in the combustion chamber (10) by using the spark plug (15) to perform spark discharging. The operation control units (31, 32, 33) include the operation state detection part (31), the operation switching part (32) and the command output part (33). In the first operation, the spark plug (15) is not used to perform electric discharging, and the spark plug (15) is not used to emit the microwave either.

The operation control units (31, 32, 33) are configured so that during switching between the first operation and the second operation, a transitional operation is inserted between the first operation and the second operation. In the transitional operation, the spark plug (15) is not used to perform electric discharging, and instead the spark plug (15) emits the microwave to raise the temperature of the premixed gas, and consequently, the premixed gas is compression-ignited. The first operation and the transitional operation are the so-called premix compression-ignition operation. The second operation is the so-called spark ignition operation.

Furthermore, the operation control units (31, 32, 33) control the internal combustion engine (20) by using the spark plug (15) to emit the microwave to plasma formed through spark discharging performed by the spark plug (15) during the whole period in which the internal combustion engine (20) is switched to the second operation. Furthermore, the operation control units (31, 32, 33) may control the internal combustion engine (20) not by using the spark plug (15) to emit the microwave to plasma formed through spark discharging performed by the spark plug (15) during the whole period in which the internal combustion engine (20) is switched to the second operation.

Specifically, the operation state detection part (31) performs an operation state detection action for detecting the internal combustion engine (20) at a specific time interval. The operation state detection part (31) detects the rotational speed (the speed of rotation) of the internal combustion engine (20) and a load on the internal combustion engine (20), which are used as data showing the operation state of the internal combustion engine (20). The operation state detection part (31) detects the rotational speed of the internal combustion engine (20) according to an output signal of a rotational speed sensor (16). Each time the crank shaft of the internal combustion engine (20) rotates, the rotational speed sensor (16) outputs a pulse signal (the output signal). Furthermore, the operation state detection part (31) detects the load on the internal combustion engine (20) according to an output signal of an accelerator position sensor (17). The accelerator position sensor (17) outputs a position signal (the output signal) showing an operation amount of an accelerator pedal. Furthermore, during the detection of the load on the internal combustion engine (20), as an alternative, an airflow meter measuring the flow of intake air may be used to replace the accelerator position sensor (17).

Once executing the detection action, the operation state detection part (31) outputs a detection signal, showing an operation state of the internal combustion engine (20) (a current operation state of the internal combustion engine (20)) obtained through the detection action, to the operation switching part (32). The detection signal includes data showing the current rotational speed of the internal combustion engine (20) and data showing the current load on the internal combustion engine (20).

Figure 3:
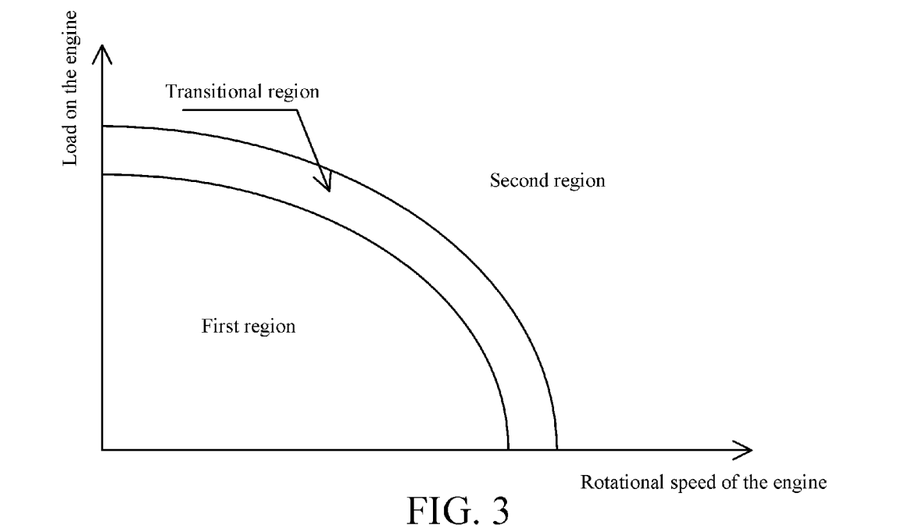
FIG. 3 is an operation control map according to Embodiment 1.

The operation switching part (32) has an operation control map (as shown in FIG. 3) with the rotational speed of the internal combustion engine (20) and the load on the internal combustion engine (20) being set as parameters. In the operation control map, an operation control region, used for determining an operation manner according to the operation state of the internal combustion engine (20), is set with a first region enabling the internal combustion engine (20) to execute the first operation, a second region enabling the internal combustion engine (20) to execute the second operation, and a transitional region enabling the internal combustion engine (20) to execute the transitional operation. The first region is a low-speed-light-load side region. The second region is a high-speed-heavy-load side region. The transitional region is sandwiched between the first region and the second region.

Upon receiving the detection signal from the operation state detection part (31), the operation switching part (32) performs a judgment action on the current operation state of the internal combustion engine (20), so as to judge which operation manner, selected from the first operation, the second operation and the transitional operation, shall be set. At each time of receiving the detection signal, the operation switching part (32) performs the judgment action. The judgment action is performed by using the rotational speed of the internal combustion engine (20) and the load on the internal combustion engine (20) included in the detection signal. During the judgment action, it is judged which region on the operation control map coordinate values (called "current coordinate values" below)—determined according to the rotational speed of the internal combustion engine (20) and the load on the internal combustion engine (20) included in the detection signal—are in, so as to select an operation manner (called "set operation manner" below) which shall be set according to the current operation state of the internal combustion engine (20). When the set operation manner selected through the judgment action is different from the current operation manner, the operation switching part (32) outputs a switch signal, instructing switching of the operation manner, to the command output part (33). When the set operation manner is the same as the current operation manner, the operation switching part (32) does not output any switch signal to the command output part (33).

Specifically, when the first operation is to be switched to, the operation switching part (32) outputs a first switch signal to the command output part (33). When the second operation is to be switched to, the operation switching part (32) outputs a second switch signal to the command output part (33). When the transitional operation is to be switched to, the operation switching part (32) outputs a third switch signal to the command output part (33).

Upon receiving the first switch signal, the command output part (33) sets a first operation mode. While the command output part (33) sets the first operation mode, the internal combustion engine (20) performs the first operation. Upon receiving the second switch signal, the command output part (33) sets a second operation mode. While the command output part (33) sets the second operation mode, the internal combustion engine (20) performs the second operation. Upon receiving the third switch signal, the command output part (33) sets a transitional operation mode. While the command output part (33) sets the transitional operation mode, the internal combustion engine (20) performs the transitional operation.

For example, if the rotational speed of the internal combustion engine (20) and the load on the internal combustion engine (20) increase during the first operation, the current coordinate values move from the first region to the transitional region. In this way, the operation switching part (32) outputs the third switch signal to the command output part (33), so that the command output part (33) sets the transitional operation mode, and the internal combustion engine (20) performs the transitional operation. Furthermore, if the rotational speed of the internal combustion engine (20) and the load on the internal combustion engine (20) increase further, the current coordinate values move from the transitional region to the second region. In this way, the operation switching part (32) outputs the second switch signal to the command output part (33), so that the command output part (33) sets the second operation mode, and the internal combustion engine (20) performs the second operation. Like this, if the rotational speed of the internal combustion engine (20) and the load on the internal combustion engine (20) increase continuously, the operation manner of the internal combustion engine (20) switches from the first operation to the second operation through the transitional operation.

Furthermore, if the rotational speed of the internal combustion engine (20) and the load on the internal combustion engine (20) decrease during the second operation, the current coordinate values move from the second region to the transitional region. In this way, the operation switching part (32) outputs the third switch signal to the command output part (33), so that the command output part (33) sets the transitional operation mode, and the internal combustion engine (20) performs the transitional operation. Furthermore, if the rotational speed of the internal combustion engine (20) and the load on the internal combustion engine (20) decrease further, the current coordinate values move from the transitional region to the first region. In this way, the operation switching part (32) outputs the first switch signal to the command output part (33), so that the command output part (33) sets the first operation mode, and the internal combustion engine (20) performs the first operation. Like this, if the rotational speed of the internal combustion engine (20) and the load on the internal combustion engine (20) decrease continuously, the operation manner of the internal combustion engine (20) switches from the second operation to the first operation through the transitional operation.

Actions of the Control Device

The actions of the control device (30) are described. First, the actions of the control device (30) in the state of being set to the first operation mode are described. In particular, the actions of the control device (30) for a single cylinder are described below.

In the first operation, an exhaust stroke ends, and after the piston (23) passes a top dead center, the intake valve (27) is opened, and an induction stroke starts. After the induction stroke starts, the command output part (33) outputs an injection signal to the injector (29) immediately, so as to enable the injector (29) to inject the fuel. A premixed gas formed by premixing the fuel and air flows into the combustion chamber (10). Then, after the piston (23) passes a bottom dead center, the intake valve (27) is closed immediately, and the induction stroke ends.

Once the induction stroke ends, a compression stroke, which compresses the premixed gas in the combustion chamber (10), starts. In the compression stroke, once the piston (23) moves to be close to the top dead center, the premixed gas starts to burn by self-ignition. The piston (23) moves to the side of the bottom dead center through an expansive force when the premixed gas burns. Then, before the piston (23) passing a stroke intermediate point reaches the bottom dead center, the exhaust valve (28) is opened, and an exhaust stroke starts. The exhaust valve (28) is closed before the piston (23) passing the stroke intermediate point reaches the top dead center. Therefore, the exhaust stroke ends. In the Embodiment 1, the exhaust valve (28) is closed before the piston (23) reaches the top dead center, so that a waste gas remains in the combustion chamber (10). That is, in the first operation, operation is performed in an internal Exhaust Gas Recirculation (EGR) manner.

In the first operation, multiple positions of the premixed gas are ignited substantially at the same time. Strictly speaking, very small time differences lie between ignition timings of the positions. In the first operation, during the compression stroke of the premixed gas, the overall temperature of the premixed gas rises. Therefore, at the moment of the initial ignition, the premixed gas not ignited enters a state very close to the coming ignition. After the initial ignition, the ignition occurs one after another within a very short period of time, and flames diffuse from the ignition positions. Like this, in the first operation, the multiple positions of the premixed gas are ignited substantially at the same time, so that the burning time of the first operation is very short, and an internal pressure peak value of the combustion chamber (10) is very large.

Now, the actions of the control device (30) in the state of being set to the second operation mode are described. In particular, the actions of the control device (30) for a single cylinder are described below.

In the second operation, when the piston (23) almost reaches the top dead center, the intake valve (27) is opened, and an induction stroke starts. In the second operation, after the piston (23) passes the top dead center, the exhaust valve (28) is closed immediately, and the exhaust stroke ends. After the exhaust stroke ends, the command output part (33) outputs an injection signal to the injector (29) immediately, so as to enable the injector (29) to inject the fuel. Therefore, the premixed gas flows into the combustion chamber (10). Then, after the piston (23) passes the bottom dead center, the intake valve (27) is closed immediately, and the induction stroke ends.

Once the induction stroke ends, a compression stroke, which compresses the premixed gas in the combustion chamber (10), starts. Then, in the compression stroke, before the premixed gas is self-ignited, the command output part (33) outputs an ignition signal to the ignition coil (36). Therefore, the voltage of a voltage pulse output from the first pulse power supply (34) is increased in the ignition coil (36), and the ignition coil (36) outputs a high-voltage pulse to the mixer circuit (38). On the other hand, in the compression stroke, before the premixed gas is self-ignited, the command output part (33) outputs a radiation signal to the second pulse power supply (35). Therefore, a voltage pulse is provided from the second pulse power supply (35) to the magnetron (37), and the magnetron (37) outputs a microwave to the mixer circuit (38).

In the mixer circuit (38), the high-voltage pulse output from the ignition coil (36) and the microwave output from the magnetron (37) are mixed. Furthermore, the mixed high-voltage pulse and microwave are provided to the discharge electrode (15a) of the spark plug (15). As a result, between the discharge electrode (15a) and a grounding electrode (15b) of the spark plug (15), the spark discharging is performed through the high-voltage pulse, thereby forming small-scale plasma. Furthermore, the discharge electrode (15a) of the spark plug (15) emits the microwave to the small-scale plasma. The small-scale plasma absorbs energy of the microwave and expands.

On the other hand, the premixed gas is forcibly ignited because of the spark discharging. As a result, the premixed gas starts to burn and the flames expand from positions ignited by the spark discharging. Compared with the first operation, the second operation has fewer ignited positions. Therefore, compared with the first operation, the burning time in the second operation is longer, and the internal pressure peak value in the combustion chamber (10) is smaller.

In the second operation, the premixed gas in the region formed with the plasma produces a large amount of chemically active chemical species such as OH free radicals and ozone within a short period of time. As a result, the OH free radicals and ozone facilitate the combustion reaction of the premixed gas. Furthermore, the temperature and pressure of the premixed gas in the region formed with the plasma rise. Therefore, the spreading speed of the flames is increased. Therefore, compared with a case in which the microwave is not emitted to the plasma formed through the spark discharging performed by the spark plug (15), the burning time is shorter in the second operation, and the internal pressure peak value in the combustion chamber (10) is larger.

Once the premixed gas starts to burn, the piston (23) moves to the side of the bottom dead center through the expansive force when the premixed gas burns. Then, before the piston (23) passing the stroke intermediate point reaches the bottom dead center, the exhaust valve (28) is opened, and an exhaust stroke starts. As stated above, after the induction stroke starts, the exhaust stroke ends immediately.

In the second operation, the radiation signal is output before the spark discharging is performed between the electrodes (15a, 15b) of the spark plug (15), and the microwave starts to be emitted before the spark discharging is performed. The microwave continues to be emitted until the spark discharging is performed. The duration of the radiation of the microwave is very short. The time of each microwave radiation is determined according to a pulse width of the voltage pulse output from the second pulse power supply (35) to the magnetron (37). Furthermore, a timing when the radiation signal starts to be output is not limited to being before the spark discharging is performed between the electrodes (15a, 15b) of the spark plug (15). If only the microwave starts to be emitted before the small-scale plasma disappears, the timing when the radiation signal starts to be output may be after the spark discharging is performed.

Furthermore, in the second operation, the time of each microwave radiation (the pulse width of the voltage pulse output from the second pulse power supply (35) to the magnetron (37)) is set to be shorter than a specific time, so that the expanded plasma does not become the thermal plasma, that is, the expanded plasma is maintained in a non-equilibrium plasma state. Furthermore, the time of each microwave radiation may be set to be longer than a specific time, so that the expanded plasma becomes the thermal plasma. Furthermore, in order to suppress production of thermal NOx, the time of each microwave radiation may be set to be shorter than a specific time, so that the temperature of the premixed gas does not exceed a specific temperature (for example, 1,800° C.).

Furthermore, in the second operation, the energy density of the plasma formed through the electric discharging performed by the spark plug (15) is set to be higher than minimum ignition energy, so that the spark discharging performed by the spark plug (15) ignites the premixed gas. However, alternatively, the energy density of the plasma formed through the electric discharging performed by the spark plug (15) may be set to be lower than the minimum ignition energy. In the case, the premixed gas is not ignited by the spark discharging performed by the spark plug (15), but the premixed gas is forcibly ignited by the expansion of the small-scale plasma caused by the microwave.

Now, the actions of the control device (30) in the state of being set to the transitional operation mode are described. The actions of the control device (30) for a single cylinder are illustrated below. Furthermore, the on/off timing of the intake valve (27) and the on/off timing of the exhaust valve (28) are the same as those in the first operation, which are not repeated herein. The differences from the first operation are described below.

In the transitional operation, the command output part (33) does not output any ignition signal, but outputs a radiation signal to the second pulse power supply (35) at a specific timing before the premixed gas is self-ignited in a compression stroke. Therefore, a voltage pulse is provided from the second pulse power supply (35) to the magnetron (37), and the magnetron (37) outputs a microwave. The microwave is emitted from the discharge electrode (15a) of the spark plug (15), through the mixer circuit (38), to the combustion chamber (10).

In the combustion chamber (10), by the radiation of the microwave from the spark plug (15), the temperature of the premixed gas in a strong electric field region rises dramatically. In the transitional operation, the initial ignition is performed in the region of the premixed gas where the temperature is raised dramatically through the microwave. At the moment of the initial ignition, the regions where the temperature is not raised much through the microwave fail to enter the state very close to the coming ignition. Therefore, the transitional operation has a longer time from the initial ignition to last ignition than the first operation. Therefore, compared with the first operation, the burning time in the transitional operation is longer, and the internal pressure peak value in the combustion chamber (10) is smaller. Furthermore, the transitional operation has more ignition positions than the second operation so that, compared with the second operation, the burning time is shorter, and the internal pressure peak value in the combustion chamber (10) is larger.

Effects of Embodiment 1

In the Embodiment 1, during the switching between the first operation and the second operation, the transitional operation is performed between the first operation and the second operation, in which "the burning time" and "the internal pressure peak value of the combustion chamber (10)" are between those of the first operation and those of the second operation. Therefore, the differences in the "burning time" and the "internal pressure peak value of the combustion chamber (10)" between the first operation and the second operation are alleviated through the transitional operation. Therefore, the torque variations in the internal combustion engine (20) are reduced during the switching of the operation manner.

Furthermore, in the Embodiment 1, during the whole period, in which the internal combustion engine (20) switches to the second operation, the microwave is emitted to the plasma formed through the spark discharging performed by the spark plug (15), thereby shortening the burning time of the second operation. Therefore, the differences in "the burning time" and "the internal pressure peak value of the combustion chamber (10)" between the first operation and the second operation are reduced, thereby further reducing the torque variations in the internal combustion engine (20) during the switching of the operation manner.

Embodiment 2

In an Embodiment 2, the second operation and the transitional operation are respectively different from those in the Embodiment 1. However, during the switching between the first operation and the second operation, the control device (30) inserts the transitional operation between the first operation and the second operation, which is the same as that in the Embodiment 1.

The first operation is an operation in which the premixed gas is compression-ignited in the combustion chamber (10), which is the same as that in the Embodiment 1. The second operation is an operation in which the spark plug (15) does not emit any electromagnetic wave, but the spark plug (15) performs spark discharging to forcibly ignite the premixed gas in the combustion chamber (10). The transitional operation is an operation in which the spark plug (15) performs the spark discharging and the spark plug (15) emits an electromagnetic wave to plasma formed through the spark discharging in the combustion chamber (10). The transitional operation is the same as the second operation of the Embodiment 1. In the Embodiment 2, the first operation is a so-called premix compression-ignition operation, and the second operation is a so-called spark ignition operation.

In the following description, the first operation is the same as the first operation of the Embodiment 1, and the transitional operation is the same as the second operation of the Embodiment 1. Therefore, only the actions of the control device (30) in the state of being set to the second operation mode are described. In particular, the actions of the control device (30) for a single cylinder are described below.

In the second operation, when the piston (23) almost reaches the top dead center, the intake valve (27) is opened, and an induction stroke starts. In the second operation, after the piston (23) passes the top dead center, the exhaust valve (28) is closed immediately, and the exhaust stroke ends. After the exhaust stroke ends, the command output part (33) outputs an injection signal to the injector (29) immediately, so as to enable the injector (29) to inject the fuel. Therefore, the premixed gas flows into the combustion chamber (10). Then, after the piston (23) passes the bottom dead center, the intake valve (27) is closed immediately, and the induction stroke ends.

Once the induction stroke ends, a compression stroke, which compresses the premixed gas in the combustion chamber (10), starts. Then, in the compression stroke, before the premixed gas is self-ignited, the command output part (33) outputs an ignition signal to the ignition coil (36). Therefore, the voltage of the voltage pulse output from the first pulse power supply (34) is increased in the ignition coil (36). Then, the high-voltage pulse output from the ignition coil (36) is provided to the discharge electrode (15a) of the spark plug (15) through the mixer circuit (38). As a result, between the discharge electrode (15a) and the grounding electrode (15b) of the spark plug (15), spark discharging is performed through the high-voltage pulse, thereby forcibly igniting the premixed gas.

Once the premixed gas starts to burn through the spark discharging, the piston (23) moves to the side of the bottom dead center through the expansive force when the premixed gas burns. Then, before the piston (23) passing the stroke intermediate point reaches the bottom dead center, the exhaust valve (28) is opened, and an exhaust stroke starts. As stated above, after the induction stroke starts, the exhaust stroke ends immediately.

Herein, as stated above, the burning time of the first operation is very short, and the internal pressure peak value of the combustion chamber (10) is very large. Furthermore, in the second operation, the flames diffuse from positions forcibly ignited by the spark plug (15). As stated above, compared with the first operation, the burning time in the second operation is longer, and the internal pressure peak value in the combustion chamber (10) is smaller. Furthermore, in the transitional operation, OH free radicals and ozone produced in the region formed with the plasma facilitate the combustion reaction of the premixed gas. Furthermore, the temperature and pressure of the premixed gas in the region formed with the plasma rises, thereby increasing the spreading speed of the flames. Therefore, compared with the second operation in which the electromagnetic wave is not emitted to the plasma formed through the spark discharging performed by the spark plug (15), the burning time in the transitional operation is shorter, and the internal pressure peak value in the combustion chamber (10) is larger. Furthermore, compared with the first operation in which the multiple positions of the premixed gas are ignited substantially at the same time, the burning time in the transitional operation is longer, and the internal pressure peak value of the combustion chamber (10) is smaller. In the Embodiment 2, as in the Embodiment 1, during the switching between the first operation and the second operation, the transitional operation is performed between the first operation and the second operation, in which "the burning time" and "the internal pressure peak value of the combustion chamber (10)" are between those of the first operation and those of the second operation.

Variations of Embodiment 2

The variations of the Embodiment 2 are described. In the variation, during the switching between the first operation and the second operation, the control device (30) inserts a first transitional operation and a second transitional operation between the first operation and the second operation. Furthermore, the first operation and the second operation are the same as those in the Embodiment 2.

Figure 4:
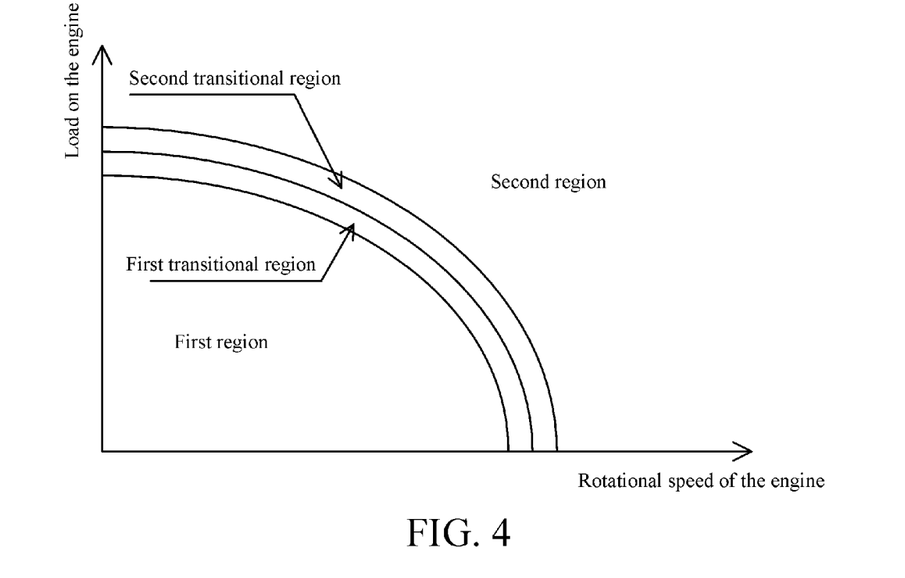
FIG. 4 is an operation control map of a variation according to Embodiment 2.

As shown in FIG. 4, in the operation control map, a first transitional region enabling the internal combustion engine (20) to execute the first transitional operation and a second transitional region enabling the internal combustion engine (20) to execute the second transitional operation are sandwiched between the first region and the second region. The first transitional region is closer to the first region than the second transitional region.

The first transitional operation is an operation, in which the spark plug (15) does not perform electric discharging, instead the spark plug (15) emits the electromagnetic wave to raise the temperature of the premixed gas, and consequently, the premixed gas is compression-ignited. That is, the first transitional operation is the transitional operation of the Embodiment 1. On the other hand, the second transitional operation is an operation in which the spark plug (15) performs the spark discharging and the spark plug (15) emits the electromagnetic wave to the plasma formed through the spark discharging in the combustion chamber (10). The second transitional operation is the transitional operation of the Embodiment 2. Compared with the first transitional operation, the burning time in the second transitional operation is longer, and the internal pressure peak value in the combustion chamber (10) is smaller. In the variation, towards the high-speed-heavy-load side, transformation is performed gradually towards the operation in which the burning time is longer and the internal pressure peak value of the combustion chamber (10) is smaller.

Other Embodiments

The embodiments described above may also be implemented in the following manner.

Figure 5:
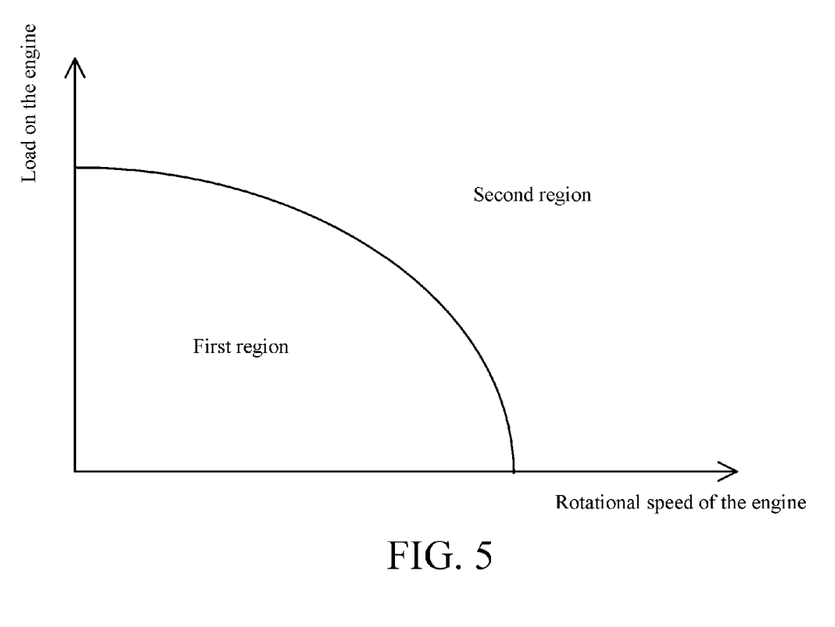
FIG. 5 is an operation control map according to other embodiments.

In the Embodiments 1 and 2, the control device (30) may also be configured so that during the switching between the first operation and the second operation, the internal combustion engine (20) is made to execute the transitional operation for only a specific number of cycles. In the case, as shown in FIG. 5, in the operation control map, the first region is adjacent to the second region. When the current coordinate values move from the first region to the second region, the internal combustion engine (20) cannot switch to the second operation immediately. After executing the transitional operation for only a specific number of cycles, the internal combustion engine (20) switches to the second operation. Furthermore, when the current coordinate values move from the second region to the first region, the internal combustion engine (20) cannot switch to the first operation immediately. After executing the transitional operation for only a specific number of cycles, the internal combustion engine (20) switches to the first operation. Furthermore, as in the variation of the Embodiment 2, in the case that two transitional operations are sandwiched between the first operation and the second operation, during the switching between the first operation and the second operation the control device (30) first enables the internal combustion engine (20) to execute the first transitional operation for only a specific number of cycles, and then enables the internal combustion engine (20) to execute the second transitional operation for only a specific number of cycles.

Furthermore, in the transitional operation of the Embodiment 1 and the first transitional operation of the variation of the Embodiment 2, the timing when the microwave starts to be output may be changed in the following manner. That is, during the switching from the first operation to the second operation, the timing when the microwave starts to be output departs gradually from the timing when the premixed gas is self-ignited, so as to be brought forward, and during the switching from the second operation to the first operation, the timing when the microwave starts to be output approaches gradually to the timing when the premixed gas is self-ignited, so as to be postponed.

Furthermore, in the transitional operation of the Embodiment 1 and the first transitional operation of the variation of the Embodiment 2, the microwave intensity may be changed in the following manner. That is, during the switching from the first operation to the second operation the microwave intensity increases gradually, and during the switching from the second operation to the first operation the microwave intensity decreases gradually.

Furthermore, in the transitional operation of the Embodiment 2 and the second transitional operation of the variation of the Embodiment 2, the microwave intensity may be changed in the following manner. That is, during the switching from the first operation to the second operation the microwave intensity decreases gradually, and during the switching from the second operation to the first operation the microwave intensity increases gradually.

Figure 6:
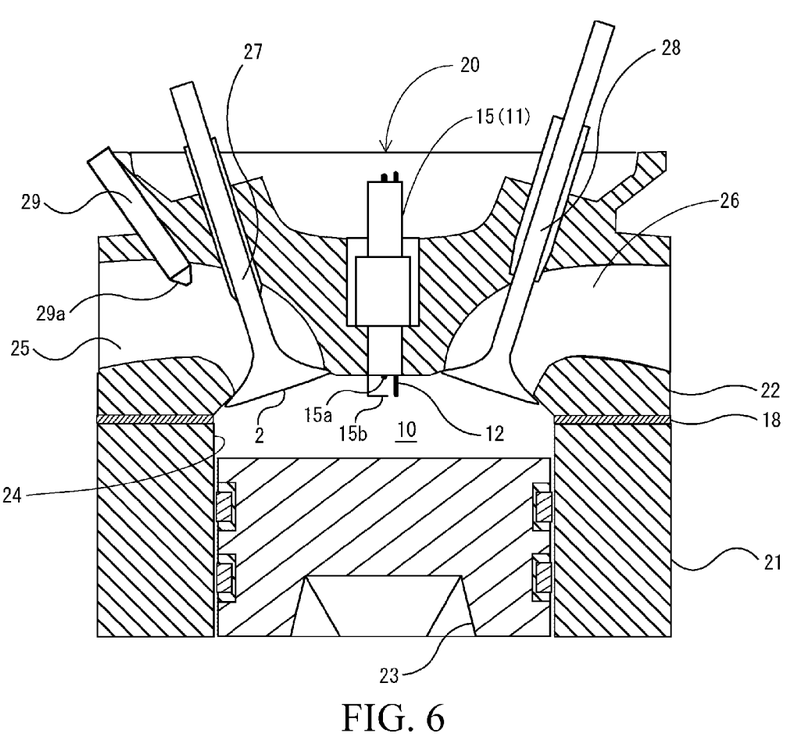
FIG. 6 is a sectional view of an internal combustion engine according to other embodiments.

Furthermore, in the Embodiments 1 and 2, the position where the high-voltage pulse is applied and the oscillation position of the microwave may be separated. In the case, as shown in FIG. 6, the microwave antenna (12) is disposed to be separated from the discharge electrode (15a) of the spark plug (15). The mixer circuit (38) is not required, the ignition coil (36) is directly connected to the spark plug (15), and the magnetron (37) is directly connected to the electromagnetic wave radiation antenna (12). Furthermore, in FIG. 6, the microwave antenna (12) is integrated with the spark plug (15), and the microwave antenna (12) may not be integrated with the spark plug (15).

Furthermore, in the Embodiments 1 and 2, the nozzle (29) of the injector (29) may be at the opening of the combustion chamber (10). In the case, for example, in an induction stroke, the fuel is injected from the nozzle (29a) of the injector (29) to the combustion chamber (10). Before the temperature and the pressure in the combustion chamber (10) satisfy the self-ignition conditions, the premixed gas formed by premixing the fuel and air is formed in the combustion chamber (10).

INDUSTRIAL APPLICABILITY

As illustrated above, the present invention is applicable to an internal combustion engine control device for switching between a first operation of compression-igniting a premix gas in a combustion chamber and a second operation of forcibly igniting the premixed gas through a discharge unit in the combustion chamber.

LIST OF REFERENCE NUMERALS

10 Combustion chamber
11 Discharge unit
12 Electromagnetic wave radiation unit
15 Spark plug (discharge unit, electromagnetic wave radiation unit)
20 Internal combustion engine
30 Internal combustion engine control device
31 Operation state detection part (operation control unit)
32 Operation switching part (operation control unit)
33 Command output part (operation control unit)

What is claimed is:
1. An internal combustion engine comprising:
a spark plug;
an microwave radiation unit for radiating an microwave to the combustion chamber; and
an operation control unit for switching between a premix compression-ignition operation and a spark ignition operation according to an operation state of the internal combustion engine, wherein
the operation control units insert a transitional operation between the premix compression-ignition operation and the spark ignition operation, and
the microwave radiation unit emits a microwave to raise the temperature of the premixed gas during the transitional operation.

* * * * *